United States Patent [19]

Fosshage

[11] Patent Number: 5,894,709

[45] Date of Patent: Apr. 20, 1999

[54] ARTICLE WRAPPING MACHINE

[75] Inventor: David J. Fosshage, Bogart, Ga.

[73] Assignee: Food Machinery Sales, Inc., Athens, Ga.

[21] Appl. No.: 08/940,640

[22] Filed: Sep. 30, 1997

[51] Int. Cl.$^6$ .............................. B65B 9/06; B65B 51/30; B65B 51/32

[52] U.S. Cl. ........................ 53/450; 53/374.4; 53/375.3; 53/479; 53/550; 493/191; 493/208

[58] Field of Search .......................... 53/450, 479, 550, 53/548, 375.3, 374.4, 373.8, 372.3, 370.8, 387.3; 493/191, 208

[56] References Cited

U.S. PATENT DOCUMENTS

| | | | |
|---|---|---|---|
| 3,218,961 | 11/1965 | Kraft et al. | 53/374.4 X |
| 3,703,841 | 11/1972 | Crawford | 83/341 |
| 3,813,998 | 6/1974 | Lotto | 493/191 |
| 3,850,780 | 11/1974 | Crawford et al. | 156/583 |
| 3,943,686 | 3/1976 | Crawford et al. | 53/182 |
| 4,035,984 | 7/1977 | Gerlach et al. | 53/28 |
| 4,102,111 | 7/1978 | Nack et al. | 53/182 |
| 4,106,262 | 8/1978 | Aterianus | 53/28 |
| 4,106,265 | 8/1978 | Aterianus | 53/180 |
| 4,532,753 | 8/1985 | Kovacs | 53/375.3 X |
| 4,637,199 | 1/1987 | Steck et al. | 53/374.4 X |
| 4,712,357 | 12/1987 | Crawford et al. | 53/450 |
| 4,840,009 | 6/1989 | Rentmeester et al. | 53/373 |
| 4,909,016 | 3/1990 | Rentmeester et al. | 53/373 |
| 4,965,985 | 10/1990 | Masubuchi et al. | 53/375.3 X |
| 5,502,952 | 4/1996 | Wildmoser | 493/191 X |
| 5,522,964 | 6/1996 | Granados | 53/372.3 X |
| 5,678,390 | 10/1997 | Pruett et al. | 53/374.4 X |

*Primary Examiner*—James F. Coan
*Attorney, Agent, or Firm*—Alston & Bird, LLP

[57] ABSTRACT

An end seal wrapping machine (10), and method of forming an end seal in a spaced series of articles (A) moved therethrough, is disclosed. The wrapping machine has a first rotating shaft (40) on which at least a first upper sealing and crimping head (41a, 41b) is positioned, with a spaced second counter-rotating shaft (81) on which a second opposed sealing and crimping head (82a, 82b) is positioned. The wrapping machine is supplied with a regularly spaced series of articles which are substantially enclosed in a continuous tube (27) of packaging film (20) upstream of the sealing and crimping heads. The articles in the tube of packaging film are passed between the sealing and crimping heads for being wrapped within the film. The first sealing and crimping head includes an elongate knife (43) formed as a part thereof, with an elongate platen (92) formed as a part of the second sealing and crimping head, and opposed to the knife. The knife is constructed and arranged to be rotatably moved into and out of engagement with the platen to pinch the packaging film therebetween to form an end seal in the packaging film. At least one air jet (54a, 54b) is mounted on the first rotating shaft with respect to the knife, the at least one air jet being sized and shaped to direct an air flow selectively emitted therethrough toward the packaging film for clamping the packaging film with respect to the platen and the knife, and for stripping the packaging film off of the knife in the event that any of the film tends to adhere thereto as the knife moves out of engagement with the platen.

32 Claims, 6 Drawing Sheets

ARTICLE WRAPPING MACHINE

FIELD OF THE INVENTION

This invention relates in general to packaging machinery. More particularly, this invention relates to an end seal wrapping machine, and a method of using same, in which an end seal is formed in a heat shrink packaging film wrapped about an article prior to passing the article through a downstream heat shrink tunnel.

BACKGROUND OF THE INVENTION

A wide variety of articles are available that have been packaged in a heat shrink packaging film. Heat shrink packaging films offer the advantage of being relatively inexpensive, yet flexible for packaging a great variety of articles in a range of shapes and sizes. When heat shrink packaging films are used, the film is first wrapped about an article so that the article is substantially enclosed within the packaging film, whereupon an end seal is formed at each of the spaced ends of the article. This is typically done on a high speed continuous motion packaging or wrapping machine constructed to wrap the articles in the packaging film. Once the end seals are formed in the heat shrink film, the wrapped package is passed to a downstream heat shrink tunnel, in which a quick blast of heated air, for example, is directed against the film wrapped article to shrink the packaging film tightly about the exterior of the article, thus providing a neat, finished package in which the article is protected by a generally impervious barrier of packaging film.

As the articles to be packaged move along a path of travel on the wrapping machine, therefore, a continuous tube of the packaging film is formed about the articles so that the articles are generally enclosed within a tube of the film, and spaced from one another within the tube of film as the articles are thereafter carried with the film toward a downstream sealing and crimping head assembly. This is typically accomplished on a horizontal wrapping machine having opposed and counter-rotating sealing and crimping heads, between which the film entrained articles are sequentially passed. In this type of wrapping machine, the upper sealing and crimping head typically includes an elongate heated knife which extends transversely across the path of travel, and is of a length sufficient to form an end seal across the respective and spaced ends of the articles being packaged. The heated knife will rotate into engagement with a counterrotating spring loaded silicon rubber platen carried on the opposed sealing and crimping head, and which is sized to receive the knife. As the packaging film is passed between the counterrotating sealing and crimping heads, therefore, it is pinched by the knife against the platen, whereupon the heat of the knife acts to melt or otherwise form the end seal at the ends of the article. As the article is being packaged, the packaging film, and the counter-rotating heads all move in the direction of the path of travel extending from an upstream end of the machine toward a downstream end thereof.

As the heated knife moves out of engagement with the newly formed end seal of the now "wrapped" article, there is a tendency for the packaging film to adhere to the heated surfaces of the knife. This has necessitated the use of spring loaded clamp bars mounted on the rotating shaft on which the knife is mounted, which are positioned with respect to the knife, for holding the packaging film against the platen and away from the sides of the knife during seal formation, and for also stripping the packaging film off of the knife edge and/or side surfaces of the knife after the end seal has been formed and as the article moves downstream away from the counterrotating sealing and crimping heads.

A typical wrapping machine of this type will also use a pair of spaced clamp bars, positioned on opposite sides of each knife or knives provided. So constructed, the clamp bars extend parallel to, and run along the length of each knife. As the knives are rotated through an arc toward and into engagement with the packaging film, i.e. when the knife moves the packaging film against the platen, the clamp bars move into engagement with the packaging film and act to hold it away from the sides of the knife so that the film will not otherwise melt onto or adhere to the sides of the knife, and hopefully this allows only the knife edge to come into contact with the packaging film for forming the end seal. Moreover, to further prevent the packaging film from adhering to the sides of the knife, as well as to the clamp bars, oftentimes the clamp bars are water cooled which thus necessitates a rather complicated construction of a water cooling system adapted for supplying the rotating clamp bars with water, with the resultant problems of component wear due to the high demands placed on packaging machines in high speed packaging operations.

One problem that has arisen due to the construction of these conventional knife and clamp bar assemblies is that a sufficient amount, i.e., length, of packaging film is required at the ends of the article so that as the clamp bars hold the film away from the knife and against the platen, enough slack film is present to allow the knife edge to come into contact with the film against the platen, which can result in surplus film being present at the ends of the wrapped article. If, for example, a relatively low energy shrink film is used, this can result in an incomplete shrinking of the film about the ends of the article after being passed through the shrink tunnel, thus resulting in what is known to those in the art as "dog-ears" or "fish-eyes" at the ends of the package after heat shrinking the film. Aside from being an unsightly problem, this also leads to the possibility that the packaging film may be caught or torn during further processing and handling, which may result in breaking the seal of the film about the package, which, of course, leads to lowered production efficiencies, as well as leading to increased problems for retailers who may have articles that are inadvertently torn or opened while on display.

Another problem with the known sealing and crimping assemblies using knives and clamp bars is that the end seal may sometimes be incompletely formed due to the failure of the film to melt together into an integral seal because the end seal is not sufficiently cooled to allow the film forming the end seal to remain sealed, i.e. melted together, thus resulting in an opening being formed at the ends of the article, which opening may be opened moreso, or created in the first instance, by the passage of the article through the shrink tunnel. If the end seal is not adequately sealed in the first instance, the quick blast of heated air which shrinks the film about the article in the shrink tunnel may act to open the unformed seal at the ends of the article rather than draw the film tightly about the ends of the article to complete the packaging operation. It is therefore desirable to cool the newly formed end seals as quickly as possible in order to complete formation of the end seal prior to passage of the article into the heat shrink tunnel. However, this is problematic with the known knife and clamp bar arrangements.

Yet, another problem that exists with the known knife and clamp bar arrangements is that the packaging film will invariably come into contact with the sides of the knife, adjacent the knife edge, with the result that plastic residue will build up on the knife, thus necessitating machine shutdown so that the knife edge and sides can be stripped of the melted plastic residue that builds upon these surfaces. The clamp bars may also need to be cleaned of this plastic residue.

What is needed, therefore, but seemingly unavailable in the art, is an improved end seal wrapping machine which dispenses with the use of clamp bars for holding the packaging film with respect to the sealing knife, and which also is adapted to strip any packaging film which comes into engagement with the knife off of the knife. What is also needed is an improved end seal and wrapping machine which will ensure that a completed end seal is formed in the film wrapped about the ends of the article prior to passing the article through a heat shrink tunnel, such that the ends of the package are not otherwise opened, or left with surplus film after the packaging film is shrunk about the article. Additionally, there is a need for such an improved end seal wrapping machine which provides for improved production rates, and thus improved operating efficiencies and lower packaging costs, in a high speed continuous motion packaging operation. Moreover, such an improved end seal wrapping machine should cool the packaging film at the end seals as much as possible, without the use of any kind of a water cooled clamp bar, to permit these higher production rates to be attained.

SUMMARY OF THE INVENTION

The present invention provides an improved end seal wrapping machine, and method of forming an end seal in the heat shrink packaging film wrapped about a spaced series of articles, which overcomes some of the design deficiencies of other end seal wrapping machines and wrapping methods known in the art, to include minimizing the problem of leaving surplus film or open end seals at the ends of the wrapped articles. Moreover, the present invention accomplishes these objects at greater production rates than heretofore known in the art. Moreover, the relative simplicity of construction, ease of use, and reduced maintenance requirements of this invention, in comparison with known end seal wrapping machines, allows for a greater degree of flexibility in use in that this construction is readily adapted for use with most any type of heat shrink packaging film, and is adapted for forming end seals about the ends of most any type, and of any size, article to yield consistently finished high quality packaged articles.

The improved end seal wrapping machine of this invention thus includes a pair of counter-rotating sealing and crimping heads supported on the framework of a horizontal wrapping machine of a type generally known to those of skill in the art. So constructed, the packaging machine will have a first rotating shaft on which a first sealing and crimping head, i.e., a knife block, is positioned, with a spaced second counter-rotating shaft on which a second opposed sealing and crimping head is positioned, the two sealing and crimping heads being counter-rotated with respect to, and in timed relationship with, one another. The wrapping machine is supplied with a regularly spaced series of articles which are wrapped and substantially enclosed within a continuous tube of the heat shrink packaging film upstream of the sealing and crimping heads, the articles in the tube of packaging film being passed between the sealing and crimping heads for being sealed within the film.

The wrapping machine includes an elongate knife formed as a part of the first sealing and crimping head, with an elongate platen supported on the second sealing and crimping head and opposed from the knife, such that the knife rotates into, and out of, engagement with the platen as the continuous tube of packaging film, and articles entrained therein, are passed therebetween such that the packaging film is pinched between the knife and a resilient surface of the platen so that an end seal, and crimp, is formed at each end of each article as the articles pass successively therethrough.

In fashion entirely heretofore unknown in the art, the improved end seal wrapping machine of this invention includes at least one air jet, or a series of air jets, mounted on the first rotating shaft with respect to the knife, the at least one air jet being sized and shaped to direct an air flow selectively emitted therethrough toward the packaging film. As the knife on the first rotating shaft rotates into engagement with the platen, and pinches the packaging film therebetween, the at least one air jet will selectively emit an air flow therethrough directed across a side, or both sides, of the knife, and against the packaging film for positioning the packaging film with respect to the knife, i.e. to hold the packaging film against the platen, and for also holding the packaging film away from the knife to minimize the problem of film residue accumulating on the knife. Moreover, as the knife rotatably moves out of engagement with the platen, the at least one air jet continues to emit a stream of air directed toward the packaging film, and across the side, or sides, of the knife to help strip the packaging film off of the knife to prevent film build-up thereon. The at least one air jet of the invention may comprise a single air jet, or spaced series of air jets extending along a first side, or along both opposed sides of a single knife, or along the sides, or opposed sides of a plurality of radially spaced knives mounted on the first rotating shaft.

A first valve, preferably a two-way solenoid valve, is mounted on the first rotating shaft and is in airtight communication with the at least one air jet mounted thereon. The solenoid valve is also in airtight communication within an internal air passageway defined within and extending along at least a portion of the length of the rotating shaft, the internal air passageway terminating at a rotating union in airtight engagement with the air passageway, and positioned on the end of the rotating shaft. A second solenoid valve is provided which is in airtight communication with the rotating union, and is constructed and arranged to selectively emit a jet of compressed or pressurized air therethrough into the internal air passageway and toward the first valve as the knife, or knives, rotatably move into, and out of engagement with the respective platen, or platens formed as a part of the sealing and crimping head assembly of the invention. If more than one knife is provided as a part of the invention, then the first valve mounted on the rotating shaft will alternatingly direct the air passed through the second valve, the rotating union, and through the internal air passageway, to the appropriate one, or ones, of the at least one air jets positioned with respect to the respective knife then moving into and out of engagement with a respective one of the platens. The air jets positioned with respect to the knife, or knives, which are not then being moved into and out of engagement with the platens are not supplied with air, and do not otherwise emit a jet of air therethrough.

So constructed, the at least one air jet mounted on the first rotating shaft with respect to the knife, or knives, acts to position or clamp the packaging film with respect to each knife as it moves into engagement with the platen, i.e. it clamps the packaging film against the platen, and also acts to strip the packaging film off of the knife after the end seal has been formed and the knife moves out of engagement with the platen. Moreover, the air passed through the at least one air jet acts to cool the end seal thus ensuring that a tight integral end seal is formed prior to passing the article to a downstream heat shrink tunnel so that as the heat shrink film is drawn tightly about the article, the end seals do not tend to open up during the heat shrink process. Yet another feature of the construction of this invention is that minimal amounts of packaging film are needed at the ends of the article to form the end seals due to the fact that a length of film sufficient to allow for a clamp bar, a knife, and a second clamp bar to move into engagement with the packaging film is no longer required, thus allowing for "tighter" end seals upstream of the heat shrink tunnel.

It is, therefore, an object of the invention to provide an improved wrapping machine, and method of forming an end seal, which minimizes the mechanical engagement of the packaging film by the packaging machine for the purpose of forming end seals therein during packaging operations.

An additional object of the improved wrapping machine, and method, of the present invention allows for the formation of a tighter end seal about the spaced ends of the articles, reducing the presence of excess film at the spaced ends of the articles, and thus greatly minimizing the problem of dog ears or fish eyes in the packaging film.

Yet another object of the present invention is to provide an improved wrapping machine, and method, which cools the end seal prior to passing the article to a downstream heat shrink tunnel which thus ensures that a tight integral end seal is formed about the spaced ends of the articles being packaged.

Still another object of the present invention is to provide an improved wrapping machine, and method, which allows for greater packaging speeds to be attained than heretofore known in the art.

It is also an object of the present invention to provide an improved wrapping machine, and method, which is simple in design and construction, is easy to use, and which is rugged and durable in structure and in use.

The present invention accomplishes these objects, among others, while providing for flexible, efficient, and continuous high speed packaging operations using shrink wrap plastic packaging films. Therefore, other objects, features, and advantages of the present invention will become apparent upon reading the following specification, when taken in conjunction with the accompanying drawings.

DETAILED DESCRIPTION

Figure 1:
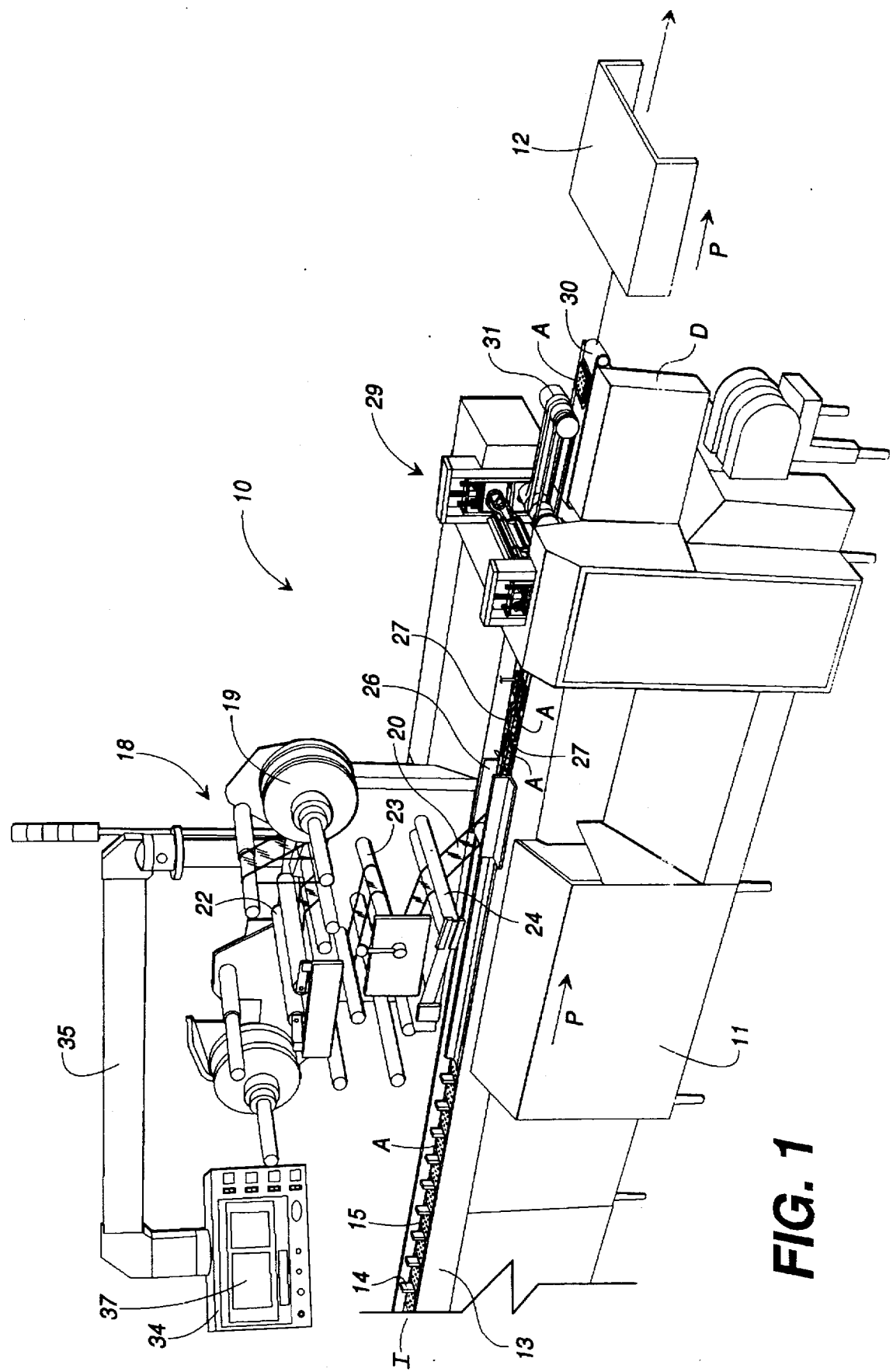
FIG. 1 is a perspective view of a preferred embodiment of a horizontal end seal wrapping machine of the present invention.

Referring now to the drawings, in which like reference characters indicate like parts throughout the several views, numeral 10 of FIG. 1 illustrates generally a horizontal wrapping machine. Wrapping machine 10, for example, may include the MACH 3 series of horizontal wrapping machines manufactured by Food Machinery Sales, Inc. of Athens, Ga., as disclosed more fully in U.S. patent application Ser. No. 08/545,346, entitled Horizontal Form, Fill, And Seal Packaging Machine, filed on Oct. 17, 1995, and incorporated herein by this reference. Wrapping machine 10 thus has a cabinet style framework I 1 extending from an infeed, or upstream, end, denoted by the reference character "I", in a downstream direction along a path of travel "P" toward the discharge, or downstream, end thereof, denoted by the reference character "D". Situated downstream of the discharge end of the wrapping machine, and schematically illustrated, is a conventional heat shrink tunnel 12 constructed and arranged to shrink the plastic packaging film snugly about the articles.

Supported at the infeed end of wrapping machine 10 is an infeed conveyor 13 extending along the path of travel and having a spaced series of upstanding flight pins 14 fastened to an endless chain or table-top conveyor (not illustrated), forming spaced article receiving flights 15 therebetween, in which a spaced series of articles, denoted by the reference character "A" are positioned. Articles A, may include, for example, greeting cards, computer diskettes, videotape cassettes, audio cassettes, CD ROMs or CDs enclosed in plastic Jewell boxes, and similar articles adapted for being packaged within a heat shrink packaging film.

Still referring to FIG. 1, positioned downstream of infeed conveyor 13 is a packaging film feed assembly 18 having at least one, and in this instance two, spools 19 of a thermoplastic heat shrink packaging film 20 held thereon. As known to those of skill in the art, a suitable packaging film 20 for use with wrapping machine 10 may include polyethylene shrink films, polyolifin shrink films, for example those shrink films made by DuPont, Clasar, or Kryovac, or a polyvinylchloride ("PVC") low energy shrink film. The packaging film 20 is passed about a series of idler rollers 22 constructed and arranged to tension the packaging film prior to its being passed to a powered drive roller 23, typically powered by a servomotor, although other suitable motors, for example an AC motor, or a DC stepper motor may be used, and from drive roller 23 toward and through a pair of tension rollers 24 prior to being passed on to a film forming shoe 26.

At film forming shoe 26, the packaging film is formed as a tube 27 about the articles A as they continue to move downstream in the direction of the path of travel, i.e. toward the discharge end of the packaging machine, such that the articles are substantially enclosed in a continuous tube 27 of the packaging film. This is accomplished by forming a lap seal along the horizontally overlapped edges of the packaging film tube 27, accomplished through the use of a heated wire or rod, in known fashion. Thereafter, the articles, which are generally spaced equally apart from one another and are entrained in the packaging film, are drawn with the film toward a downstream sealing and crimping head assembly 29. The construction, and operation, of sealing and crimping head assembly 29 is described in greater detail below. It is sealing and crimping head assembly 29 which forms the end seals in the packaging film at the spaced ends of each article, crimps the articles apart from one another, and then passes the sealed and crimped, i.e., the wrapped, articles toward the downstream heat shrink tunnel by passing the articles on to a downstream discharge conveyor 30 moving in the direction of the path of travel, in conjunction with an overhead discharge conveyor 31 to ensure that the articles lie flat on the discharge conveyor as they are being separated, i.e. crimped, apart from the articles remaining in the tube of packaging film. All of this occurs in a continuous motion operation in which unwrapped articles enter the infeed end of the machine, and wrapped, i.e. sealed and crimped, articles depart the discharge end of the machine.

Also shown in FIG. 1 is a control system housing 34 supported on the wrapping machine by a pivotable support arm 35. A data input/display 37, which is a touch-sensitive data entry and display screen, is mounted within control system housing 34, and is used with the automated control system of the invention.

Figure 2:
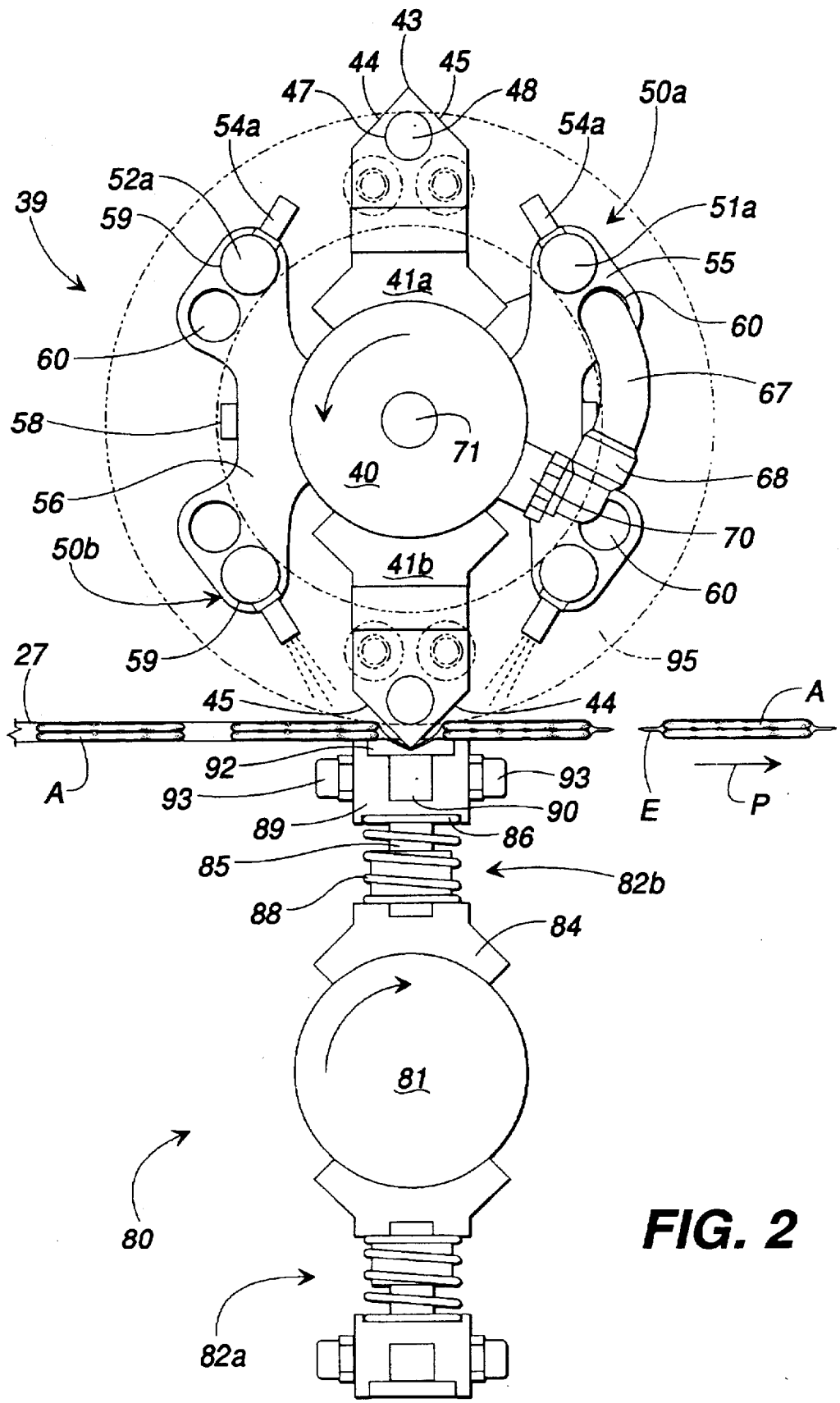
FIG. 2 is a side elevational view of the counter-rotating sealing and crimping head assemblies of the present invention, showing the unique construction, and method, practiced by the invention.

The sealing and crimping head assembly 29 of the invention is illustrated in greater detail in FIGS. 2–5. As shown in FIG. 2, the sealing and crimping head assembly includes an upper rotating sealing and crimping head assembly 39 on a first shaft 40 supported for rotational movement in the direction of the path of travel, as indicated by the directional arrow on shaft 40, and as also shown by the directional arrow in conjunction with the reference character P denoting the path of travel. Opposed to upper sealing and crimping head assembly 39 is lower sealing and crimping head assembly 80, positioned on a second counter-rotating shaft 81, shaft 81 also being supported for rotation in the direction of the path of travel, although it is counter-rotated with respect to shaft 40. Although not illustrated in greater detail herein, both of shafts 40 and 81 are suitably supported for being rotated about their longitudinal axes (not illustrated), and driven in rotation, in the fashion described in U.S. patent application Ser. No. 08/545,346, incorporated herein.

Upper sealing and crimping head assembly 39 includes at least one, and in this instance two radially spaced knife blocks 41a, 41b which are spaced 180° apart from one another, although additional knife blocks may be radially spaced on shaft 40 if so desired. For example, there may be only one, two, three, four, or a multiple number of knife blocks, as desired. Each of knife blocks 41a, 41b are constructed identically, and thus only knife block 41a is described in greater detail hereinbelow.

Knife block 41a is preferably machined from a solid piece of material, which may include any suitable metal or metal alloy having uniform heat transfer characteristics. It is anticipated here that knife block 41a will be constructed of a suitable metallic material having uniform heat transfer qualities such that the knife can be heated along its entire length (FIG. 3) for use in forming the end seal E (FIG. 2) in the packaging film 20 at each opposed and spaced end of each article A. Knife block 41a will be Teflon coated after it is machined to size to reduce the prospects of film adhering to the sides or edge of the knife. So machined, knife block 41a has a lower arcuate portion adapted for being received on shaft 40, and two protruding flanges through which appropriate mounting screws are passed which threadably secure mounting block 41a to shaft 40. Mounting block 41a includes an upright projection along which is formed an elongate knife edge 43 having a suitable radius (not illustrated) formed thereon for forming the end seal, and for crimping, the thermoplastic heat shrink packaging film used to wrap articles A. As known to those of skill in the art, the radius of knife edge 43 is packaging film specific, and is based on the thickness of the film, the qualities of the film, i.e. its chemistry and performance characteristics, as well as upon the thickness of the article A, or stacked articles A (not illustrated) being packaged, and the speed of the articles through the sealing and crimping head assembly.

Knife block 41a has a first side 44 and a second side 45, both of which extend along the length of the knife and are inclined toward knife edge 43. An internal axial bore 47 (FIG. 2) is defined within, and extends at least partially along the length of knife block 41a, and in which a suitable heating element 48 is positioned. Heating element 48 is supplied with electricity through suitable slip rings (not illustrated) constructed in known fashion for allowing electricity to be transferred to heating element 48 as shaft 40 rotates, such that knife block 41a, and in particular knife edge 43, is heated for the purpose of melting packaging film 20 to form the end seal and crimp at the spaced ends of articles A. Heating element 48a, as known to those of skill in the art, is identified as a Cal rod, or a heating rod, although it is essentially an elongate cartridge-type electrical heater sized and shaped to be slidably fit within internal bore 47, and to transfer sufficient quantities of heat to heat knife edge 43 to a temperature sufficient to form the end seal and crimp within packaging film 20.

Figure 3:
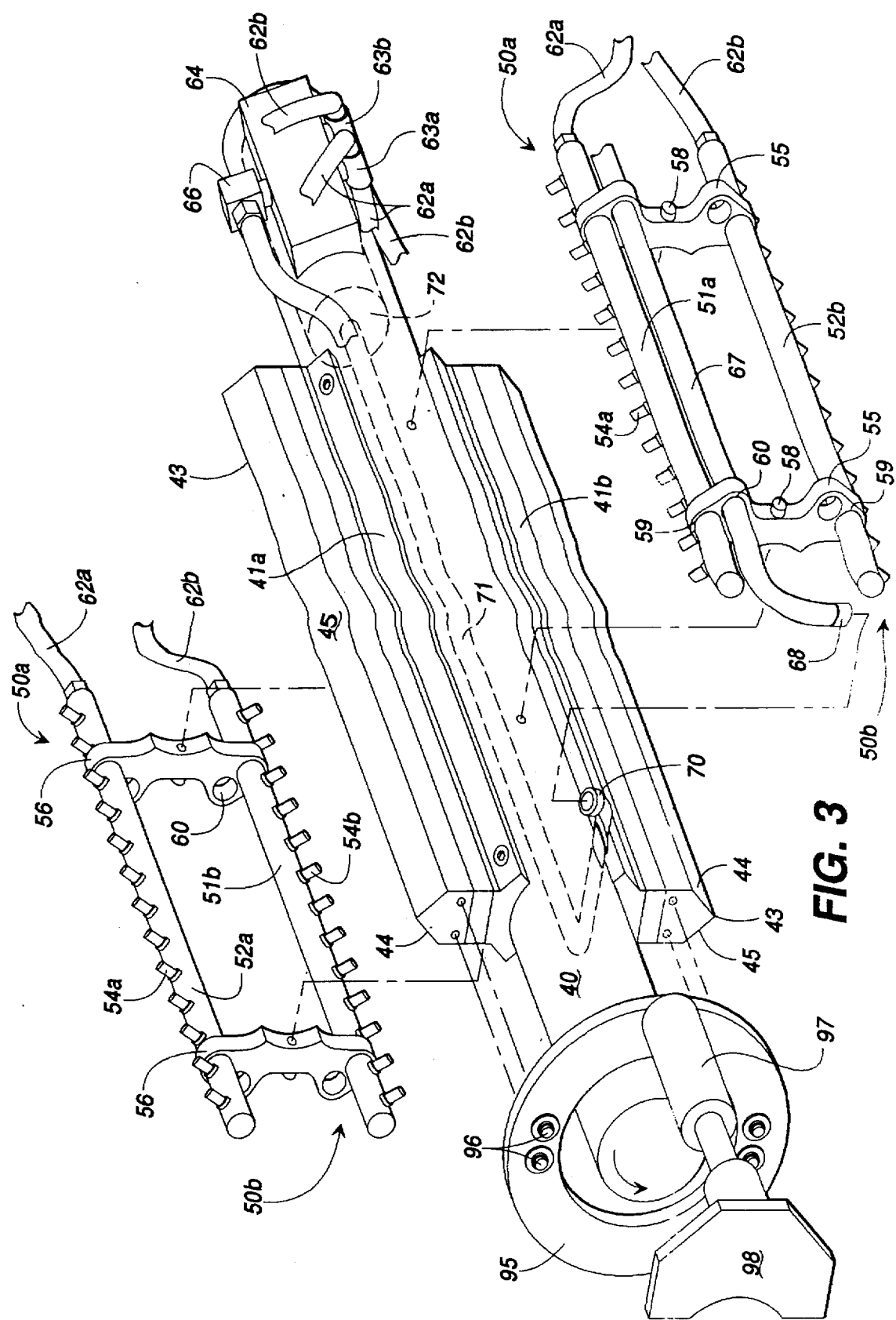
FIG. 3 is a partially exploded perspective view of the upper sealing and crimping head assembly of the invention, illustrating two spaced series of air jets extending along the sides of a pair of radially spaced end seal/crimp knives.

Still referring to FIGS. 2–5, upper sealing and crimping head assembly 39 includes, in this instance, two air jet assemblies 50a, 50b, each of which is constructed of an elongate first manifold 51a, 51b, and an elongate second manifold 52a, 52b, respectively, such that a spaced series of air jet nozzles 54a, 54b extend along the length, and on both sides of, each knife block 41a, 41b. Each of manifolds 51a, 51b, and 52a, 52b are mounted on a pair of either first carrier brackets 55, or second carrier brackets 56, respectively, as best illustrated in FIG. 3. Each of carrier brackets 55, 56 in turn is fastened to shaft 40 through the use of suitable threaded fasteners 58. Each of carrier brackets 55, 56 includes a pair of spaced holes 59 defined therein and sized to receive one of the manifolds 51a, 51b, 52a, 52b, separately therein. A second pair of holes 60 are also defined within bracket 55, 56, the purpose of which is described in greater detail below.

Although a series of air jets extending along substantially the length of each side of knife blocks 41a, 41b is illustrated, it is possible that the air jets may extend along only one side of each knife block, or only partially along one or both sides of the knife block, as desired. It is anticipated, however, that at least one air jet will be positioned on each side of the respective knife blocks 41a, 41b. It is also anticipated that if more than two, or less than two, knife blocks are provided as a part of upper sealing and crimping head assembly 39, that at least one air jet will be provided on each side of the knife block, or blocks, present.

Figure 4:
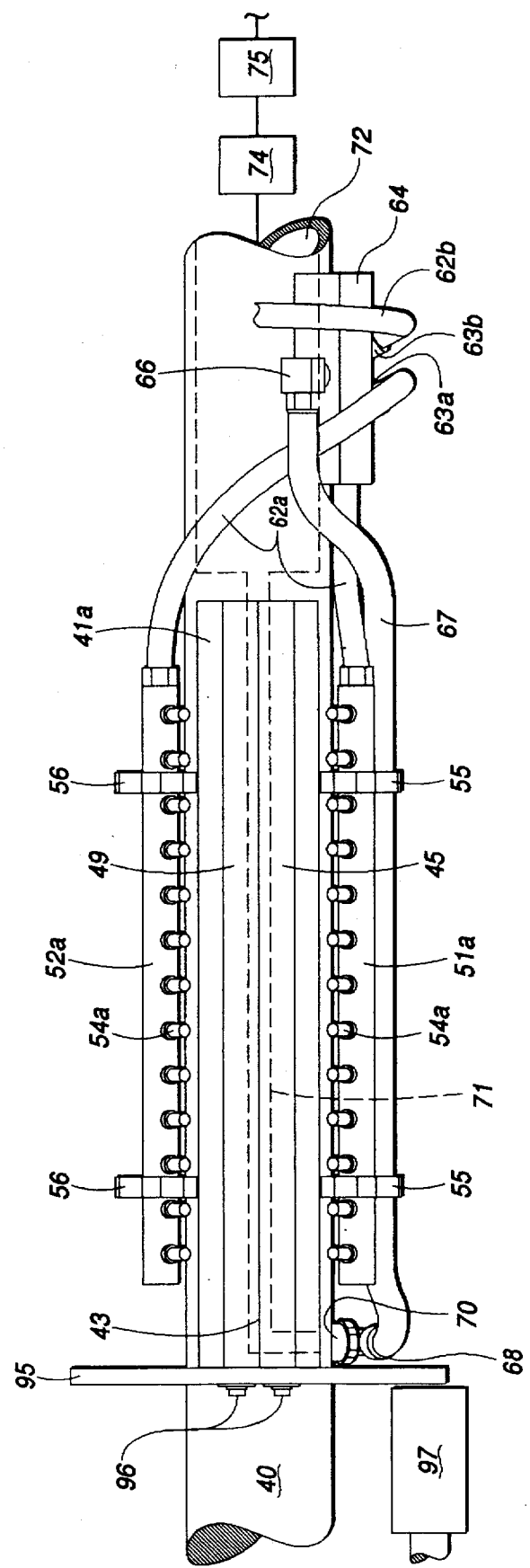
FIG. 4 is a top plan view of the upper end seal and crimping assembly illustrated in FIG. 2.
Figure 5:
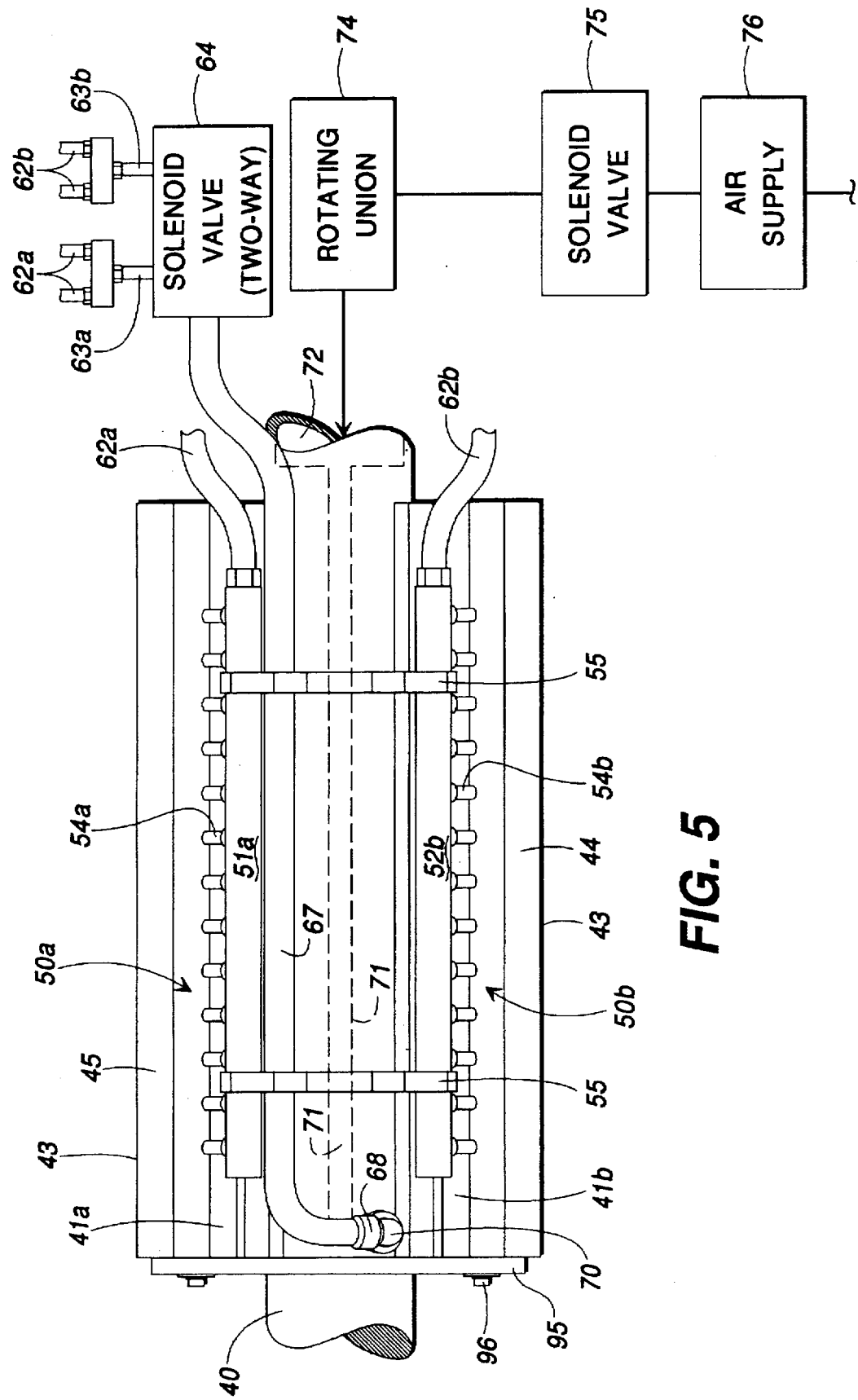
FIG. 5 is a partial side elevational view, partially cut away, of the upper end seal and crimping head assembly of FIG. 2.

As shown in FIGS. 3–5, first air jet assembly 50a is supplied with a pressurized or compressed air flow through a pair of flexible tubes 62a which are sealed on each manifold 51a, 52a, respectively, and which are sealed in airtight communication at their other ends to a T-fitting 63a which in turn is fastened in airtight communication with a first solenoid valve 64. In similar fashion, manifolds 51b, 52b of second air jet assembly 50b have a pair of flexible tubes 62b sealed thereto, which extend to an airtight T-fitting 63b, which is also in airtight communication with solenoid valve 64. Solenoid valve 64 is a two-way valve, or diverter, such that it allows a stream of air to flow therethrough such that either air jet assembly 50a, or air jet assembly 50b may selectively emit and direct the flow of air through the appropriate spaced series of air jets 54a, 54b, respectively, and across the sides 44, 45 of knife blocks 41a, 41b for the purpose of holding packaging film 20 away from the sides of the knife edge and against the respective lower seal platen assemblies 82a, 82b, and for stripping the packaging film off of the knife, and in particular the knife edge, as knife blocks 41a, 41b, respectively move out of engagement with the lower seal platen assemblies as described in greater detail below.

An airtight fitting 66 is threadably received in airtight communication with solenoid valve 64, to which an elongate, generally flexible, airtight tube 67 is fastened. Tube 67 is passed through a pair of the openings 60 defined within each of carriers 55, 56, for each air jet assembly 50a, 50b. Tube 67 is fastened at its other end to an airtight coupling 68, coupling 68 in turn being coupled to an airtight air fitting 70 threadably received within a suitable threaded opening (not illustrated) defined within shaft 40. Air fitting 70 is in communication with an internal air passageway 71 axially defined within shaft 40 as illustrated generally in FIGS. 2–5. At one end of internal air passageway 71 an internal accumulation chamber 72, also defined within shaft 40, for the purpose of allowing a sufficient volume of air to accumulate within the air passageway prior to being passed selectively through solenoid valve 64 to the selected one of air jet assemblies 50a, 50b by the automated control system 100, illustrated in FIG. 6, the operation which is described later below.

As shown schematically in FIGS. 4 and 5, a rotating union, an otherwise conventional and airtight fitting, is threadably fastened to one end of shaft 40, and is in airtight communication with accumulation chamber 72. Upstream of rotating union 74 is a second solenoid valve 75 in airtight communication with the rotating union. Second solenoid valve 75 receives compressed or pressurized air from an air supply 76, illustrated schematically in FIG. 5, air supply 76 being either a compressed air line (not illustrated) within the facility within which wrapping machine 10 is used, or may even be a separate compressor (not illustrated) provided for the purposes of supplying the compressed air for air jet assemblies 50a, 50b. All that is necessary, however, is that a source of clean, dry, compressed air be available for passage through solenoid valve 75 toward and into solenoid valve 64.

As best shown in FIGS. 2 and 3, lower sealing and crimping head assembly 80 includes a pair of radially spaced, in this instance spaced 180° apart, lower seal platen assemblies 82a, 82b. As platen assemblies 82a, 82b are otherwise identical, only platen assembly 82b is discussed in greater detail below.

As shown in FIG. 2, platen assembly 82b includes a mounting block 84 having a pair of mounting flanges sized and shaped to be threadably secured to shaft 81 by a suitable threaded fastener (not illustrated). Mounting block 84 is constructed to receive an elongate guide pin 85 therein. A proximal end of the guide pin is received within mounting block 84, and a base plate 86 is fastened to the distal end of the guide pin. A compression spring 88, a helical spring, is passed over guide pin 85 prior to its being fastened to mounting block 84, and acts to yieldably bias base plate 86 outwardly and away from mounting block 84. Fastened to base plate 86 is an aluminum sealing base 89, which is sized and shaped to support a first or base platen material 90, and on which a more resilient sealing platen 92 is also positioned. Both of platens 90, 92 are fashioned from a suitable rubber silicon used for forming end seals in shrink wrap packaging film, with the durometer, i.e. hardness, of base platen 90 being greater than that of sealing platen 92. Although not illustrated in FIG. 2, it is anticipated that sealing base 89 will be wrapped in a Teflon tape or fabric, the tape or fabric being secured to the sealing base by a pair of opposed clamp screws 93. Any such Teflon tape or fabric, however, will not be passed over the surface of sealing platen 92. Sealing platen 92, in use, is opposed to, and will receive, the respective knife edge 43 of the rotating knife blocks, knife block 41b in this instance.

As shown in FIG. 2, shafts 40 and 81 are counter-rotated with respect to one another such that respective ones of the knife blocks 41a, 41b move into and out of engagement with respective ones of the lower seal platen assemblies 82a, 82b, pinching the tube 27 of packaging film 20 therebetween to form the end seal E between adjacent ones of the articles A as they move in the direction of the path of travel. As the knife edge 43 engages the sealing platen 92, compression spring 88 is urged inwardly toward mounting block 84. As the respective knife moves out of engagement with the sealing platen, compression spring 88 is biased outwardly to maintain engagement with the knife edge for prolonging the period of time during which sealing platen 92 and knife edge 43 are engaged, thus ensuring that a complete end seal E is formed in the packaging film prior to passing the now wrapped and sealed articles to the heat shrink tunnel 12 (FIG. 1).

A continuous annular temperature sensing ring 95 is threadably fastened to knife blocks 41a, 41b, as illustrated in FIGS. 2–5, the use and structure of which is described in greater detail in U.S. patent application Ser. No. 08/545,346. An infrared temperature sensor 97 (FIGS. 3, 4) is provided for measuring the temperature of the knife blocks 41a, 41b, through ring 95 in order to control the temperature of the heated knife blocks. Temperature sensing ring 95 is constructed of a copper based alloy having the uniform heat distribution qualities, the sensing ring being mounted to the respective knife blocks by pairs of mounting screws 96. Although not illustrated, a conductive paste is used to abut the face of temperature sensing ring 95 received on the respective ends of the knife blocks 41a, 41b, respectively, whereupon the ring is threadedly secured to the knife blocks with the mounting screws, to avoid insulating the temperature sensing ring from the knife blocks, and to thus ensure that the temperature sensing accurately transmits the temperature of the knife blocks. Infrared temperature sensor 97 is supported on an infrared sensor mounting block 98, which is itself positioned on packaging machine 10 (FIG. 1) at sealing and crimping head assembly 29, although this feature of the packaging machine is enclosed within the cabinet style framework 11 and is thus not otherwise illustrated in greater detail.

Wrapping machine 10, and in particular the operation of air jet assemblies 50a, 50b, is controlled automatically by an automated control system 100, housed within control system housing 34. Automated control system 100 is illustrated schematically in FIG. 6, and includes a computer 102 used to control the operation of the system. Computer 102 is comprised of a data bus 103 in two-way data communication with a processor 104, a computer readable random access storage medium, designated as RAM 106, a second computer readable storage medium, a read only memory, ROM, 107, and three input/output cards 108, 110, and 111. Processor 104 may comprise any suitable microprocessor, and may be either a PC based processor, or a McIntosh based processor, dependent upon the software used to control the operation of the system.

The software used to operate the system will be stored in either RAM 106, or ROM 107, for example burned into an EPROM chip, if so desired, as ROM 107. RAM 106 may comprise any computer accessible and readable memory storage device, which may include a floppy disk, a hard disk drive, a magnetic tape drive, a CD-ROM, a read/write CD, or even a digital video disk storage device, dependent upon the desires of the user of packaging machine 10. Although not illustrated herein, it is understood by those in the art that the control program used to control the operation of packaging machine 10 will be comprised of executable blocks of programmable computer code read from either RAM 106, or ROM 107, and processed within processor 104. Here it is anticipated that the control program utilized to operate packaging machine 10, and in particular air jet assemblies 54a, 54b, through solenoid valves 64 and 75, is the AML® motion control language developed by Pacific Scientific Company of Newport Beach, Calif. AML® is a computer software program designed for use with motion control systems, and uses a multi-tasking operating system, iRMX, for multi-tasking control of event-driven and object-oriented applications.

Figure 6:
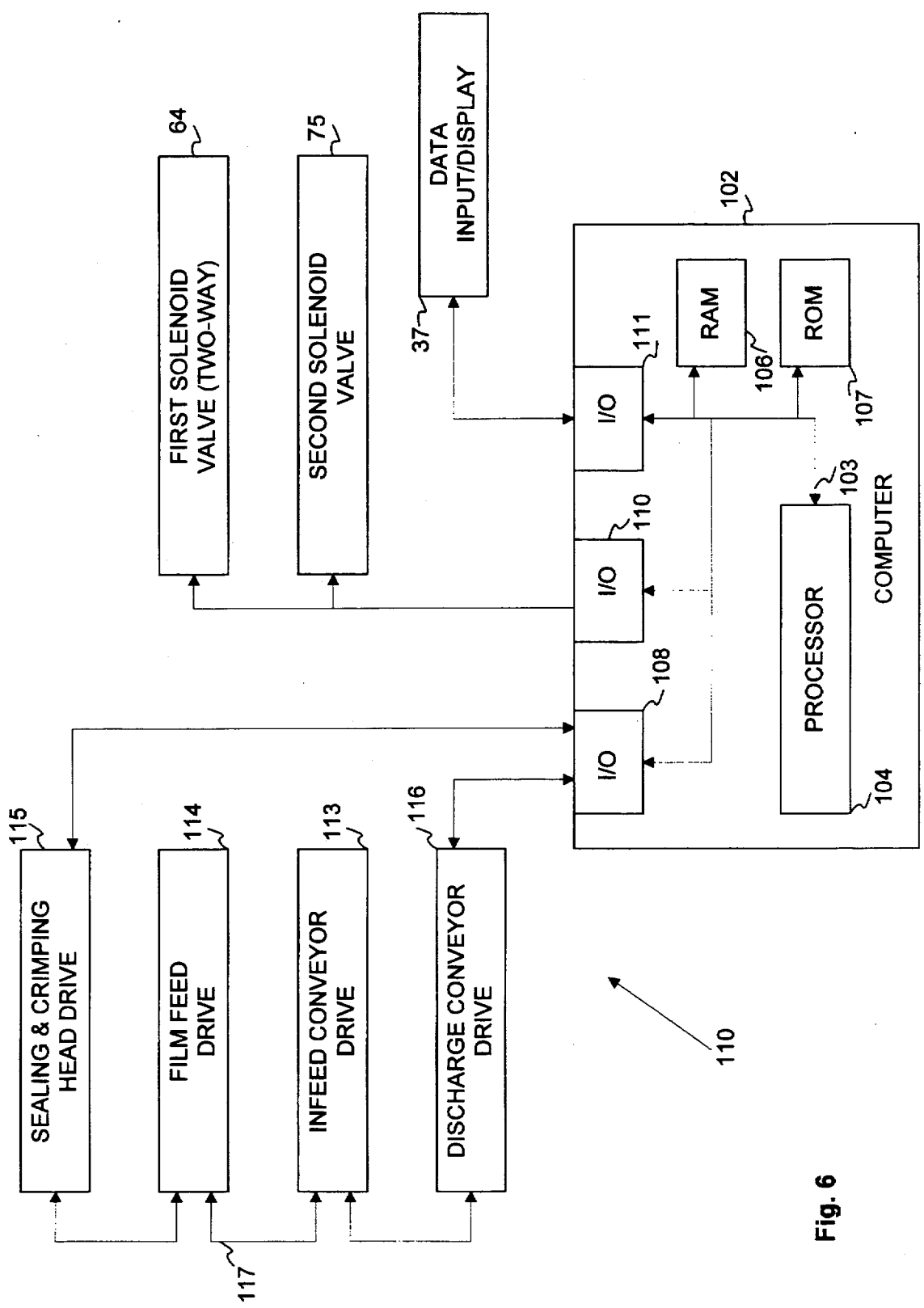
FIG. 6 is a schematic illustration of the automated control system used with the improved wrapping machine of this invention.

Input/output card 108 of FIG. 6 is a SERCOS (Serial Real-Time Communications Standard) interface board/adapter used with a fiber optic ring 117, connected to a discharge conveyor drive 116, infeed conveyor drive 113, a film feed drive 114, and a sealing and crimping head assembly drive 115. It is anticipated that each one of drives 113–116 will be a separate servomotor having a suitable encoder for digitally reporting the position of its servomotor to processor 104 through input/output cards 108, 110, and/or 111, and data bus 103. It is anticipated that sealing and crimping head drive 115 will comprise a single servomotor (not illustrated), which will power either shaft 40 or 81 directly, the other shaft being driven in an exact one-to-one relationship by a spur gear train (not illustrated) as disclosed in U.S. patent application Ser. No. 08/545,346, or any other suitable gear train. Also, it is possible, although not illustrated herein, that each of shafts 40, 81 could be powered by a separate servomotor such that the appropriate knife blocks 41a, 41b, could be phased with respect to the lower sealing platen assemblies 82a, 82b, respectively, when, and if desired. It is anticipated, however, that such a construction will not be necessary and that a standard construction using one single servomotor to drive both of the shafts 40, 81 will be utilized.

Second input/output adapter card 110 is constructed to emit a control signal generated by processor 104 to first solenoid valve 64, the two-way solenoid valve, and to the second solenoid valve, valve 75. Once a respective one of the knife blocks 41a, 41b, moves into engagement with a respective one of the lower seal platen assemblies 82a, 82b, the drive position thereof being known from the digital drive position signals emitted from the encoder formed as a part of sealing and crimping head drive 115, second solenoid valve 75 is actuated by processor 104 so that compressed air is allowed to flow therethrough into the rotating union, through the internal air passageway within shaft 40, through supply tube 67, and into solenoid valve 64, whereupon solenoid valve 64 selectively directs the compressed air to the appropriate one of air jet assemblies 50a, 50b, in alternating fashion, dependent upon which one of the knife blocks 41a, 41b, respectively, is moving into engagement with a respective one of the lower seal platen assemblies 82a, 82b, at that time. As discussed above, it is anticipated that only that series of air jets associated with the knife block which is in engagement with its respective lower seal platen assembly will be actuated, the other series of air jets, if provided, being inactive at that time. It is also anticipated that if only a single knife block 41a or 41b is provided that only a single series of air jets 50a or 50b would be used therewith, and that first solenoid valve 64 could be left in a permanently open position, or could be dispensed with entirely, if so desired, the operation of the air jet or jets being controlled strictly by second solenoid valve 75. Although solenoid valve 64 selectively allows air to pass therethrough to either one of the series of air jets 50a, 50b, air is not allowed to flow into solenoid valve 64 until such time as second solenoid valve 75 is actuated by computer 102.

Still referring to FIG. 6, the third input/output adapter card 111 is a two-way data input/output board in communication with data input/display 37, a touch-sensitive screen through which the operational parameters of the machine are displayed, and through which a pre-programmed menu of the operational parameters of the machine stored in either RAM 106 or ROM 107 may be selected when, for example, the size of the articles being packaged is changed, the packaging film being used is changed, the operational speed of the machine changes, and so forth.

OPERATION

In operation a spaced series of articles A are moved along infeed conveyor 13 toward packaging film feed assembly 18, whereupon a continuous tube of packaging film 27 is wrapped thereabout, as illustrated in FIG. 1. After the tube of packaging film is wrapped about the articles, they are passed along the path of travel and moved toward sealing and crimping head assembly 29. The horizontally overlapped seam of packaging film which is created when the film is wrapped as a tube about the articles is moved against a suitable heated rod or wire to form a lap seal along the length of the continuous tube of packaging film 27 while it moves toward sealing and crimping head assembly 29. Thereafter, and as shown in FIG. 2, the tube of packaging film in which the articles are entrained is passed between opposed ones of knife blocks 41a, 41b, and lower seal platen assemblies, 82a, 82b, respectively.

As shown generally in FIG. 2, the two parallel series of air jets 54b, forming a part of air jet assembly 50b, on both sides of knife block 41b, create a pocket of air between sides 44, 45, knife edge 43, and packaging film 20, respectively. These air pockets have the effect of urging the packaging film away from the sides of the knife and against the lower seal platen assembly 82b, and in particular against sealing platen 92, for the purpose of clamping or otherwise holding the packaging film on the lower seal platen assembly as the end seal and crimp are formed by knife edge 43. Processor 104 will actuate the appropriate one of the air jet assemblies 50a, 50b, shortly before a respective knife block moves into engagement with a respective one of the sealing platens, and will continue to signal solenoid valve 75 to direct air through first solenoid valve 64 until such time as after the knife block has moved out of engagement with its respective lower seal platen assembly. Accordingly, after knife edge 43 has formed the end seal and crimp in the packaging film, and as the now wrapped and crimped article A moves downstream along the path of travel with respect to the sealing and crimping head assembly, air jets 54b continue to blow across and along sides 44, 45 of the knife block, to ensure that the packaging film, and in particular any excess packaging film at the ends of the articles, should it be present, will not adhere to or foul the edge or sides of the knife.

Although it is possible, and likely that some film will seek to accumulate on the sides of the knife block and/or the knife edge, the use of these air jets has proven to be effective in stripping or otherwise removing packaging film off of the knife in order to ensure that a minimal amount of film residue, if any, builds up on the knife blocks. Another feature that results from this construction is that as air jets 54b emit a jet of air toward the packaging film, they also cool, and thus solidify, the end seal formed in packaging film 20 so that the end seal is not otherwise opened up by the shrinkage of the film as the article is passed through the heat shrink tunnel 13 (FIG. 1). Although the clamp bars of the prior art were water cooled, the clamp bars did not become engaged with the end seal, and thus did not act to cool the end seal after it was formed.

Thereafter, as knife block 41a is moved toward and into engagement with lower seal platen assembly 82a, processor 104 signals second solenoid valve 75 once again to emit pressurized air therethrough toward first solenoid valve 64, and signals solenoid valve 64 to alternate which one of the air jet assemblies, air jet assembly 50a, in this instance, will be supplied with compressed air, whereupon the air flow is selectively emitted through air jets 54a against the packaging film. This process continues repeatedly until such time as sealing and crimping head assembly drive 115 is stopped, whereupon processor 104 will detect this occurrence, and will not emit the appropriate control signals to solenoid valves 64, 75.

The duration of the air jet emitted through air jet assemblies 50a, 50b can be selectively determined from a predetermined menu of options contained within the control program called out of RAM 106 or ROM 107, and accessed through data input/display 37. Also, and as discussed above, should only a single knife block 41a or 41b be provided, then first solenoid valve 64 can be dispensed with, or left in the appropriate open position for the corresponding air jet assembly 50a, 50b, provided, with the operation of the air jets controlled through second solenoid valve 75 in conjunction with computer 102. Also, and if, for example, four radially spaced knife blocks (not illustrated) are provided, then two solenoid valves 64 would be required, each one of which would be a two-way valve, and second solenoid valve 75 would itself be a two-way solenoid valve, such that the flow of air would be selectively passed to each one of the four such knife blocks sequentially as they rotate into and out of engagement with their respective lower platen seal assemblies.

Computer 102, as shown in FIG. 6, is made aware of the drive position of infeed conveyor drive 113, film feed drive 114, sealing and crimping head drive 115, as well as discharge conveyor drive 116, by the encoders (not illustrated) of those drives such that the positions of the respective articles along the path of travel is known when used with a suitable optic sensor (not illustrated) to detect the presence of articles A within flights 15 of the infeed conveyor 13, as well as the presence of packaging film on packaging film feed assembly 18. Accordingly, based on the feedback from the encoder (not illustrated) formed as a part of sealing and crimping head assembly drive 115, as the knife block 41b of FIG. 2, for example, is rotatably moved toward and into engagement with lower seal platen assembly 82b, it being otherwise known to the computer that a supply of articles is available for packaging, as is the packaging film itself, processor 104 signals solenoid valve 75, which directs a flow of air through rotating union 74, through internal accumulation chamber 72, through internal air passageway 71, through supply tube 67, and into two-way solenoid valve 64. Processor 104 also actuates first solenoid valve 64 so that the appropriate series of air jets, in this instance air jet assembly 50b, are actuated, whereupon a jet of air is selectively emitted through air jets 54b across the first and second sides 44, 45 of knife block 41b, toward knife edge 43, and in particular against the packaging film adjacent the knife block. This jet of air will simultaneously hold or clamp the tube 27 of packaging film 20 against lower seal platen assembly 82b, while also holding film 20 away from sides 44, 45 of knife block 41b.

Once the knife edge 43 begins to move out of engagement with sealing platen 92, air jets 54b continue to emit a jet of air against film 20. This jet of air serves to force or push the packaging film at the ends of the articles A away from the sides, and edge, of the knife block to minimize the prospects of fouling same with the film once the end seal/crimp is made, and to cool the end seal.

Accordingly, the invention disclosed herein provides an improved wrapping machine, and method of wrapping articles, heretofore unknown in the art, and which allows for packaging operations to be performed at much greater rates of speed than heretofore known. For example, the known horizontal wrapping machines can typically package articles in a thermoplastic shrink wrap packaging film moving at the rate of approximately 140–150 feet of film per minute through the machine. With this machine, packaging rates of 200–225 feet per minute are attainable, and even greater rates may be attainable based on advances in packaging film technology, as experimentation has proven that the impediment to still greater production rates is the inability of the known heat shrink tunnels to handle a greater volume of articles for shrink wrapping at this increased production rate. Moreover, wrapping machine 10 of this invention accomplishes the above-described operations with a far simpler apparatus than those which are known, i.e. it has no water cooled clamp bars that touch or engage the packaging film, and which also passes cooling air toward the end seal ensuring that a complete end seal is formed by cooling and thus solidifying the end seal so formed, which also requires that less packaging film is needed to form the end seal at each end of the article which thus minimizes the prospects of a dog-eared or fish-eyed appearance of the package once it is shrink wrapped. As the use of rotating clamp bars is avoided by this construction, the use of a rotating cooling water supply system to the clamp bars is also avoided, thus greatly simplifying not only the machine, but also the maintenance requirements of the machine.

While preferred embodiments of the invention have been disclosed in the foregoing specification, it is understood by those skilled in the art that variations and modifications thereof can be made without departing from the spirit and scope of the invention, as set forth in the following claims. Moreover, the corresponding structures, materials, acts, and equivalents of all means or step plus function elements in the claims are intended to include any structure, material, or acts for performing the functions in combination with other claimed elements, as specifically claimed herein.

I claim:

1. A wrapping machine for sealing and crimping an article wrapped in a flexible packaging film, the wrapping machine having a first rotating shaft on which a first sealing and crimping head is positioned, and a spaced second counter-rotating shaft on which a second opposed sealing and crimping head is positioned, the wrapping machine being supplied with a regularly spaced series of articles which are substantially enclosed in a continuous tube of the packaging film upstream of the sealing and crimping heads, the articles in the tube of packaging film being passed between the sealing and crimping heads for being packaged within the film, said wrapping machine comprising:

an elongate knife formed as a part of the first sealing and crimping head;

an elongate platen supported on the second sealing and crimping head and opposed from said knife;

said knife being constructed and arranged to be rotatably moved into and out of engagement with said platen;

at least one air jet mounted on the first rotating shaft with respect to the knife, said at least one air jet being sized and shaped to direct an air flow selectively emitted therethrough toward the packaging film.

2. The wrapping machine of claim 1, further comprising a first valve positioned on the first shaft in air-tight communication with said at least one air jet, said first valve being constructed and arranged to selectively pass pressurized air to said at least one air jet.

3. The wrapping machine of claim 2, further comprising a second valve in air-tight communication with said first valve, said second valve being constructed and arranged to be selectively opened in response to the knife being rotatably moved into and out of engagement with the platen for selectively passing pressurized air to said first valve.

4. The wrapping machine of claim 3, further comprising a computer, said computer being constructed and arranged to determine the rotational position of the knife and of the platen with respect to one another, and to signal said second valve to open for passing pressurized air to said first valve in response to the knife being rotatably moved into and out of engagement with the platen.

5. The wrapping machine of claim 3, wherein said first valve and said second valve each comprises a solenoid valve.

6. The wrapping machine of claim 2, further comprising a rotating union fastened to the first shaft, said union being in air-tight communication with said first valve and a second valve, said second valve being constructed and arranged to be selectively opened for passing compressed air through said union to said first valve.

7. The wrapping machine of claim 1, said at least one air jet comprising at least one first air jet mounted on the first rotating shaft with respect to a first side of the knife, and at least one second air jet mounted on the first rotating shaft with respect to a second side of the knife opposed from said first side.

8. A wrapping machine for sealing and crimping an article wrapped in a flexible packaging film, the wrapping machine having a first rotating shaft on which at least two radially spaced first sealing and crimping heads are positioned, and a spaced second counter-rotating shaft on which at least two radially spaced second sealing and crimping heads are positioned, said first sealing and crimping heads being opposed from said second sealing and crimping heads, respectively, as the first and the second shafts are counter-rotated with respect to one another, the wrapping machine being supplied with a regularly spaced series of articles which are substantially enclosed in a continuous tube of the packaging film upstream of the sealing and crimping heads, the articles in the tube of packaging film being passed between the sealing and crimping heads for being packaged in the film, said wrapping machine comprising:

an elongate knife formed as a part of each of the first sealing and crimping heads, respectively;

an elongate platen supported on each of the second sealing and crimping heads, respectively;

said knives being constructed and arranged to be rotatably moved into and out of engagement with said platens, respectively, for pinching the packaging film therebetween and for forming a series of end seals in the packaging film; and at least one air jet mounted on the first rotating shaft with respect to each said knife for selectively emitting a jet of compressed air toward the packaging film as the respective knives move into and out of engagement with the respective platens.

9. The machine of claim 8, further comprising a first valve mounted on the first rotating shaft in air-tight communication with each of said at least one air jets thereon, said valve being constructed and arranged to selectively allow compressed air to alternatingly flow therethrough to a respective one of said at least two air jets in response to the respective ones of the knives moving into and out of engagement with the respective ones of the platens.

10. The wrapping machine of claim 9, further comprising a second valve in air tight communication with said first valve, said second valve being constructed and arranged to be selectively opened for allowing compressed air to be passed therethrough to said first valve in response to the movement of each of the knives into and out of engagement with each of the platens, respectively.

11. The wrapping machine of claim 8, each of said at least one air jets comprising a series of spaced air jets extending at least partially along at least one side of each respective knife.

12. The wrapping machine of claim 11, further comprising a first valve in air tight communication with each of said series of spaced air jets, said first valve being constructed and arranged to be selectively opened to allow compressed air to alternatingly flow therethrough to each respective one of said series of air jets in response to the respective ones of the knives moving into and out of engagement with the respective one of the platens.

13. The wrapping machine of claim 8, each of said at least one air jets comprising a series of spaced air jets extending at least partially along opposed first and second sides of each said respective knife.

14. A method of sealing and crimping an article wrapped in a flexible packaging film on a wrapping machine, the wrapping machine having a first rotating shaft on which a first sealing and crimping head is positioned, and a second counter-rotating shaft on which a second opposed sealing and crimping head is positioned, and a regularly spaced series of articles substantially enclosed in a continuous tube of the packaging film passed between the sealing and crimping heads for being packaged, said method comprising the steps of:

a) moving a knife formed as a part of the first crimping and sealing head toward and into engagement with an opposed platen supported on the second sealing and crimping head, and pinching the packaging film therebetween;

b) forming an end seal in the packaging film in response thereto; and c) selectively emitting a jet of compressed air toward the packaging film with respect to the knife as the knife and platen are moved into and out of engagement with one another.

15. The method of claim 14, step b) further comprising the step of crimping the article from the remainder of the articles substantially enclosed in the continuous tube of packaging film as the end seal is formed.

16. The method of claim 14, step c) further comprising the step of stripping the packaging film off of the knife in response to the emission of said jet of air as the knife moves out of engagement with the platen.

17. The method of claim 14, step c) comprising the step of holding the packaging film in position with respect to both the knife and the platen with said jet of air.

18. The method of claim 14, step c) comprising the step of holding the packaging film against the platen with said jet of air.

19. The method of claim 14, step c) further comprising the step of directing the jet of air across at least one elongate side of the knife and against the packaging film as the knife is moved into and out of engagement with the packaging film.

20. The method of claim 19, further comprising the step of forming an air pocket between said at least one side of the knife and the packaging film with the jet of air, and urging the packaging film away from the knife and toward the platen with said air pocket.

21. The method of claim 14 step c) further comprising the step of emitting said jet of air from at least one air jet mounted on the first rotating shaft with respect to said knife.

22. A method of sealing and crimping an article wrapped in a flexible packaging film on a wrapping machine, the wrapping machine having a first rotating shaft on which a first sealing and crimping head is positioned, and a second counter-rotating shaft on which a second opposed sealing and crimping head is positioned, and a regularly spaced series of articles substantially enclosed in a continuous tube of the packaging film passed between the sealing and crimping heads for being packaged, said method comprising the steps of:

a) moving an elongate knife formed as a part of the first crimping and sealing head into and out of engagement with an opposed elongate platen supported on the second sealing and crimping head, and pinching the packaging film therebetween;

b) forming an end seal in the packaging film in response thereto;

c) providing at least one air jet mounted on the first rotating shaft with respect to the knife; and d) selectively emitting a jet of pressurized air directed toward the packaging film from said at least one air jet as the knife and platen are moved into and out of engagement with one another.

23. The method of claim 22, further comprising the step of stripping the packaging film off of the knife with said jet of pressurized air as the knife moves out of engagement with the platen.

24. The method of claim 22, further comprising the step of holding the packaging film in position with respect to both the knife and the platen with said jet of pressurized air as the knife moves into and out of engagement with the platen.

25. The method of claim 22, comprising the step of mounting a series of spaced air jets extending at least partially along the length of the knife on the first rotating shaft with respect to the knife.

26. The method of claim 22, comprising the steps of:

mounting a first series of spaced air jets extending at least partially along the length of a first side of said knife on the first rotating shaft;

mounting a second series of spaced air jets extending at least partially along the length of a second side of said knife on the first rotating shaft; and directing the air flow of each said series of jets across the respective sides of the knife and toward the packaging film.

27. The method of claim 22, step d) comprising the step of directing said jet of compressed air against the surface of the packaging film adjacent said knife.

28. The method of claim 22, step d) comprising the step of actuating said at least one air jet with a first solenoid valve positioned on the first rotating shaft, said first valve being in airtight communication with said at least one air jet.

29. The method of claim 28, further comprising the steps of selectively supplying said first solenoid valve with pressurized air through a second solenoid valve in air-tight communication with said first valve, and supplying said second solenoid valve with pressurized air.

30. In a wrapping machine for sealing and crimping an article wrapped in a flexible packaging film, the wrapping machine having a first rotating shaft on which a first sealing and crimping head is positioned, an elongate heated knife formed as a part of the first crimping and sealing head, a spaced second counter-rotating shaft on which a second opposed sealing and crimping head is positioned, an elongate platen supported on the second sealing and crimping head, the knife being constructed and arranged to be rotatably moved into and out of engagement with the platen for pinching the packaging film therebetween and to form an end seal in the packaging film, the wrapping machine being supplied with a regularly spaced series of articles which are generally enclosed in a continuous tube of the packaging film upstream of the sealing and crimping heads, the articles in the tube of packaging film being passed between the sealing and crimping heads for being wrapped and sealed in the film, the improvement comprising:

at least one air jet mounted on the first rotating shaft with respect to the knife, said at least one air jet being sized and shaped to direct an air flow selectively emitted therethrough toward the packaging film adjacent the knife and platen.

31. The improvement of claim 30, further comprising a first valve positioned on the first shaft in air-tight communication with said at least one air jet, said first valve being constructed and arranged to selectively pass pressurized air to said at least one air jet.

32. The improvement of claim 31, further comprising a second valve in air-tight communication with said first valve, said second valve being constructed and arranged to be selectively opened in response to the knife being rotatably moved into and out of engagement with the platen for selectively passing pressurized air to said first valve.

* * * * *